United States Patent
Chen et al.

(10) Patent No.: US 11,950,016 B2
(45) Date of Patent: Apr. 2, 2024

(54) CONTROL METHOD AND CIRCUITRY OF RECEIVER

(71) Applicant: MEDIATEK INC., Hsin-Chu (TW)

(72) Inventors: Chun-Chia Chen, Hsinchu (TW);
Chih-Hung Pan, Hsinchu (TW);
Chia-Chi Liu, Hsinchu (TW);
Shun-Fang Liu, Hsinchu (TW);
Meng-Kun Li, Hsinchu (TW);
Chao-An Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 67 days.

(21) Appl. No.: 16/848,858

(22) Filed: Apr. 15, 2020

(65) Prior Publication Data
US 2021/0329191 A1   Oct. 21, 2021

(51) Int. Cl.
*H04N 5/63* (2006.01)
*H04N 5/44* (2011.01)

(52) U.S. Cl.
CPC ............... *H04N 5/63* (2013.01); *H04N 5/44* (2013.01)

(58) Field of Classification Search
CPC .................................. H04N 5/63; H04N 5/44
USPC ........................................................ 713/300
See application file for complete search history.

(56) References Cited

U.S. PATENT DOCUMENTS

| | | | |
|---|---|---|---|
| 2006/0129855 A1 | 6/2006 | Rhoten | |
| 2010/0329363 A1 | 12/2010 | Ng | |
| 2011/0062794 A1 | 3/2011 | Vergoossen | |
| 2014/0173320 A1* | 6/2014 | Tripathi | G09G 5/12 713/375 |
| 2016/0374021 A1* | 12/2016 | Alpman | H04W 52/0229 |
| 2016/0381638 A1* | 12/2016 | Min | H04W 52/0235 370/311 |
| 2019/0042507 A1* | 2/2019 | Venkatesan | H04L 25/03006 |
| 2019/0053160 A1* | 2/2019 | He | H04W 52/0229 |

FOREIGN PATENT DOCUMENTS

| | | |
|---|---|---|
| CN | 102281614 A | 12/2011 |
| CN | 104811315 A | 7/2015 |
| CN | 110754117 A | 2/2020 |
| CN | 110928212 A | 3/2020 |
| TW | 201009383 A1 | 3/2010 |

* cited by examiner

Primary Examiner — John W Miller
Assistant Examiner — Omer Khalid
(74) Attorney, Agent, or Firm — Winston Hsu

(57) ABSTRACT

The present invention provides a control method of a receiver. The control method includes the steps of: when the receiver enters a sleep/standby mode, continually detecting an auxiliary signal from an auxiliary channel to generate a detection result; and if the detection result indicates that the auxiliary signal has a preamble or a specific pattern, generating a wake-up control signal to wake up the receiver before successfully receiving the auxiliary signal having a wake-up command.

18 Claims, 5 Drawing Sheets

CONTROL METHOD AND CIRCUITRY OF RECEIVER

BACKGROUND

In an embedded DisplayPort (eDP) specification, timing of a fast wake up mechanism is defined to have zero response time, for the better video viewing experience. However, it is difficult to achieve this goal while having the better power saving performance.

SUMMARY

It is therefore an objective of the present invention to provide a control method of a receiver that may be complied with a DisplayPort standard, which can wake up the receiver is advance, and make the receiver enter the sleep/standby mode again if there is no wake-up command is received, to solve the above-mentioned problems According to one embodiment of the present invention, a control method of a receiver is provided. The control method comprises the steps of: when the receiver enters a sleep/standby mode, continually detecting an auxiliary signal from an auxiliary channel to generate a detection result; and if the detection result indicates that the auxiliary signal has a preamble or a specific pattern, generating a wake-up control signal to wake up the receiver before successfully receiving the auxiliary signal having a wake-up command.

According to another embodiment of the present invention, a circuitry within a receiver is disclosed. The circuitry is configured to perform the steps of: when the receiver enters a sleep/standby mode, continually detecting an auxiliary signal from an auxiliary channel to generate a detection result; and if the detection result indicates that the auxiliary signal has a preamble or a specific pattern, generating a wake-up control signal to wake up the receiver before successfully receiving the auxiliary signal having a wake-up command.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
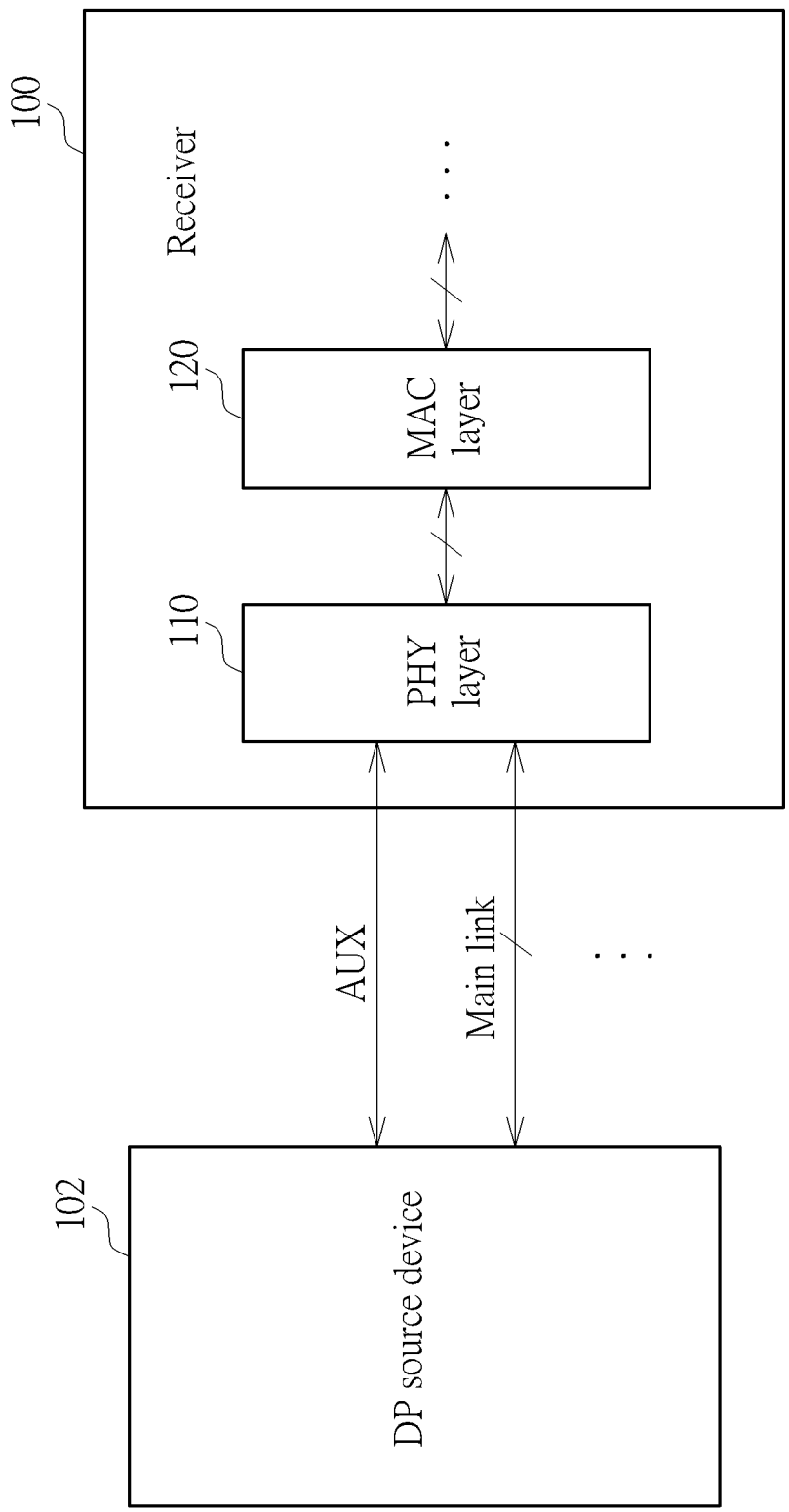
FIG. 1 is a diagram illustrating a receiver according to one embodiment of the present invention.

FIG. 1 is a diagram illustrating a receiver 100 according to one embodiment of the present invention. As shown in FIG. 1, the receiver 100 comprises a physical layer 110 and a media access control (MAC) layer 120, and the receiver 100 is arranged to connect to a DisplayPort Source device 102. In this embodiment, the receiver 100 is complied with the eDP specification, the receiver 100 may be built in a display panel, and the receiver 100 receives the commands and view stream from the DisplayPort source device 102 via an auxiliary channel AUX and main links, respectively.

It is noted that the auxiliary channel and the main links of the eDP specification are well known by a person skilled in the art, so the further descriptions about the definitions and the conventional functions of the auxiliary channel and the main links are omitted here.

Figure 2:
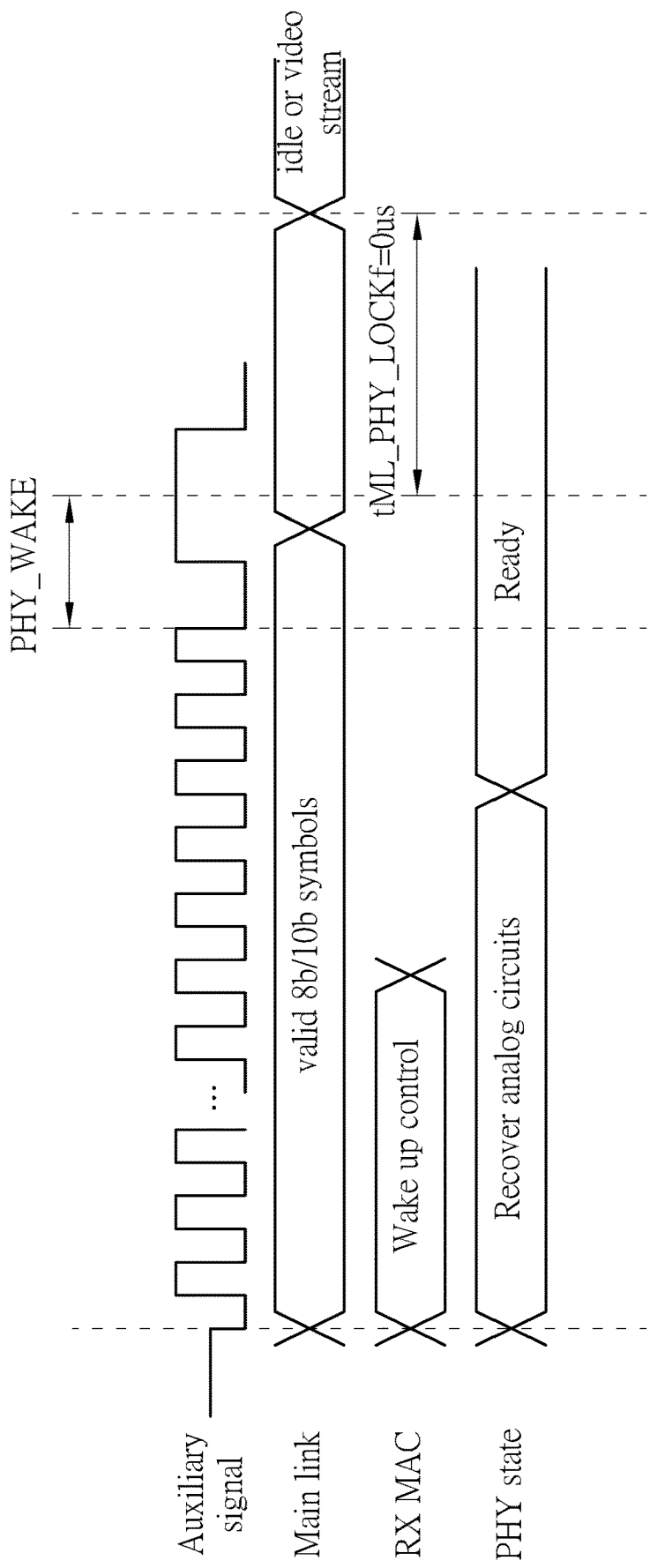
FIG. 2 is a control method of the receiver according to a first embodiment of the present invention.

FIG. 2 is a control method of the receiver 100 according to one embodiment of the present invention. Referring to FIG. 2, it is assumed that initially the receiver 100 is in a sleep mode or a standby mode, and most of the elements within the physical layer 110 are powered down or in the power-saving states. When the DisplayPort Source device 102 needs to wake up the receiver 100, the DisplayPort Source device 102 transmits valid $8b/10b$ symbols to the receiver 100 via main links, and further transmits the auxiliary signal having a preamble and a wake-up command PHY_WAKE in sequence, wherein the wake-up command PHY_WAKE has logical values "0", "0", "1", "1" in sequence. In order to have the zero response time after receiving the wake-up command PHY_WAKE, a detection circuit within the physical layer 110 is configured to continually detect the auxiliary signal when the receiver 100 is in the sleep/standby mode, to generate a detection result; and when the detection result indicates that the auxiliary signal has the preamble such as a toggle shown in FIG. 2, the MAC layer 120 immediately enable a wake-up mechanism to generate a wake-up control signal to recover/settle the analog circuits of the physical layer 110 to wake up the receiver 100. Therefore, because the receiver 100 will be immediately waked up after the toggle appears in the auxiliary signal, the physical layer 110 can be ready for receive and process the valid signals such as video stream from the DisplayPort source device 102 before the wake-up command PHY_WAKE appears in the auxiliary signal. In this embodiment, since the receiver 100 is waked up in advance, and the receiver 110 can perform the physical layer lock operation by using the $8b/10b$ symbols from the DisplayPort source device 102, the response time tML_PHY_LOCKf after the wake-up command PHY_WAKE becomes zero to satisfy the requirement of the zero response time defined in the eDP specification.

In the embodiment shown in FIG. 2, because the DisplayPort source device 102 may transmit the auxiliary signal having the preamble and another command to the receiver 100, and the MAC layer 120 immediately enables the wake-up mechanism after receiving the preamble, the receiver 100 will be waked up and enters a normal mode by mistake. To solve this problem, the embodiment further provides a mechanism to re-enter the sleep/standby mode if it is determined that no PHY_WAKE appears in the auxiliary signal.

Figure 3:
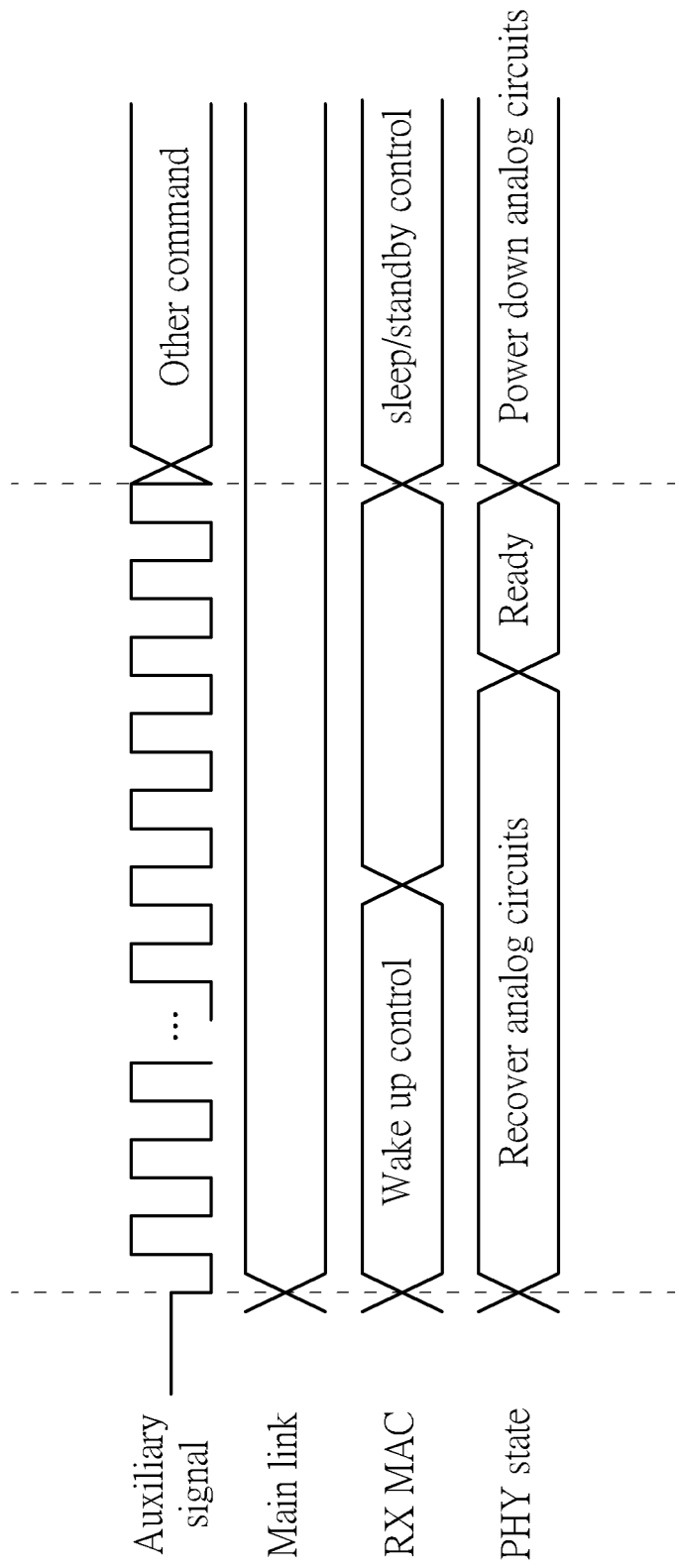
FIG. 3 is a control method of the receiver according to a second embodiment of the present invention.

Specifically, referring to the embodiment shown in FIG. 3, it is assumed that initially the receiver 100 is in the sleep/standby mode, and most of the elements within the physical layer 110 are powered down or in the power-saving states. In this embodiment, the DisplayPort source device 102 transmits the auxiliary signal having a preamble and another command in sequence, wherein the other command is not the wake-up command PHY_WAKE having the logical values "0", "0", "1", "1" in sequence. The detection circuit within the physical layer 110 is configured to continually detect the auxiliary signal when the receiver 100 is in the sleep/standby mode, to generate a detection result; and when the detection result indicates that the auxiliary signal has the preamble such as a toggle shown in FIG. 3, the MAC layer 120 immediately enable the wake-up mechanism to generate the wake-up control signal to recover/settle the analog circuits of the physical layer 110 to wake up the receiver 100. Because the receiver 100 is immediately waked up after the toggle appears in the auxiliary signal, the physical layer 110 is ready for receive and process the valid signals such as video stream from the DisplayPort source device 102 before the other command appears in the auxiliary signal. In this embodiment, the detection circuit continually detects the auxiliary signal to generate another detection result, and if the other detection result indicates that the auxiliary signal does not have logical values "0", "0", "1", "1" in sequence after the preamble, it is determined that the auxiliary signal does not have the wake-up command PHY_WAKE, and the MAC layer 120 immediately generates a sleep/standby control signal to make the receiver 100 enter the sleep mode or the standby mode, that is part of the analog circuits within the physical layer 110 is powered down or in the power-saving state.

Figure 4:
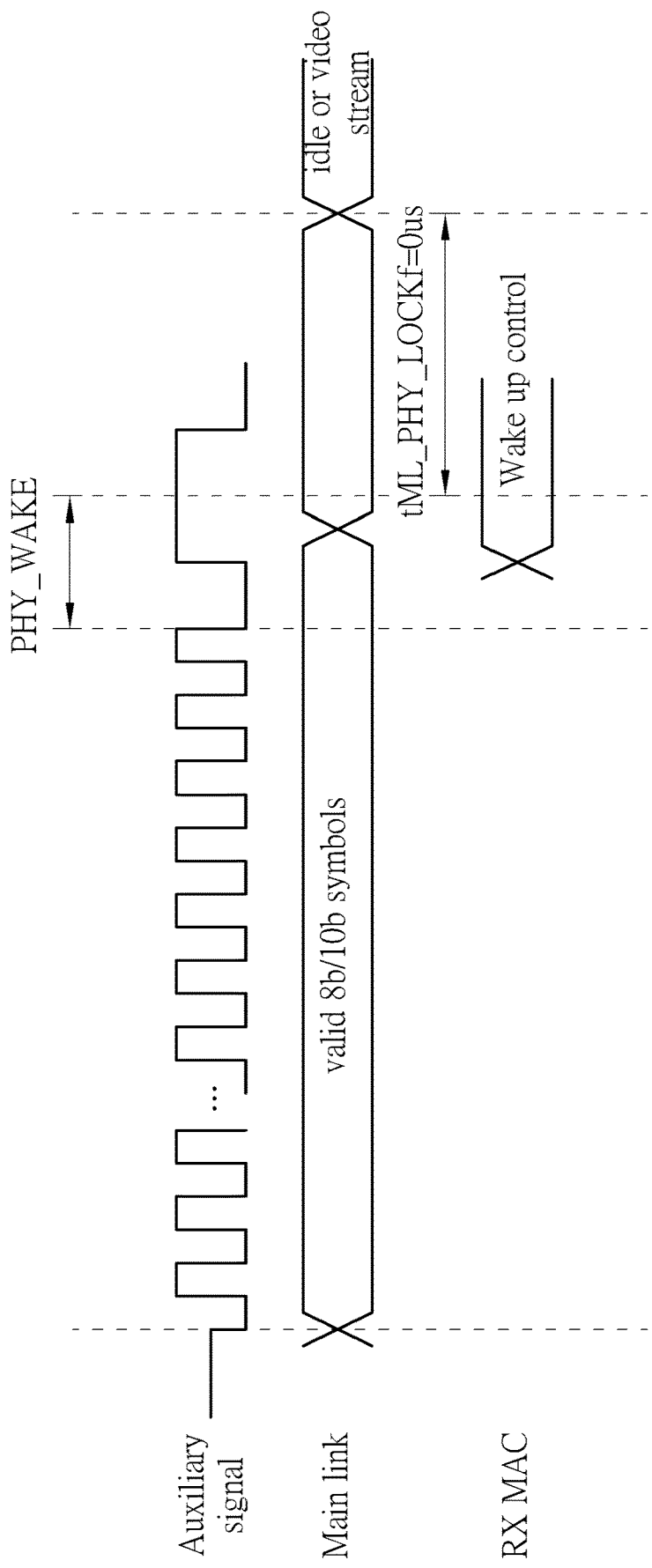
FIG. 4 is a control method of the receiver according to a fifth embodiment of the present invention.

FIG. 4 is a control method of the receiver 100 according to another embodiment of the present invention. Referring to FIG. 4, it is assumed that initially the receiver 100 is in the sleep/standby mode, and most of the elements within the physical layer 110 are powered down or in the power-saving states. When the DisplayPort Source device 102 needs to wake up the receiver 100, the DisplayPort Source device 102 transmits valid 8b/10b symbols to the receiver 100 via main links, and further transmits the auxiliary signal having a preamble and a wake-up command PHY_WAKE in sequence, wherein the wake-up command PHY_WAKE has logical values "0", "0", "1", "1" in sequence. In order to have the zero response time or lower response time after receiving the wake-up command PHY_WAKE, a detection circuit within the physical layer 110 is configured to continually detect the auxiliary signal when the receiver 100 is in the sleep/standby mode, to generate a detection result; and when the detection result indicates that the auxiliary signal has a specific pattern such as two consecutive logical values "0" following the preamble (i.e. the specific pattern is the first two logical values of the wake-up command PHY_WAKE), the MAC layer 120 immediately enable a wake-up mechanism to generate a wake-up control signal to recover/settle the analog circuits of the physical layer 110 to wake up the receiver 100. Therefore, because the receiver 100 will be immediately waked up after the two consecutive logical values "0" appear in the auxiliary signal, the physical layer 110 can be ready for receive and process the valid signals such as video stream from the DisplayPort source device 102 before the wake-up command PHY_WAKE completely appears in the auxiliary signal. In this embodiment, since the receiver 100 is waked up in advance, and the receiver 110 can perform the physical layer lock operation by using the 8b/10b symbols from the DisplayPort source device 102, the response time tML_PHY_LOCKf after the wake-up command PHY_WAKE becomes zero or a less value.

In addition, the above-mentioned specific pattern may be defined by any pattern before the last bit of the wake-up command PHY_WAKE. For example, the specific pattern may be the first three bits of the wake-up command PHY_WAKE (i.e. bits "0", "0", "1" in sequence), or the specific pattern may comprises the last few bits of the preamble and the first two or three bits of the wake-up command PHY_WAKE (i.e., bits "0", "1", "0", "0" in sequence; or bits "0", "1", "0", "0", "1" in sequence).

Figure 5:
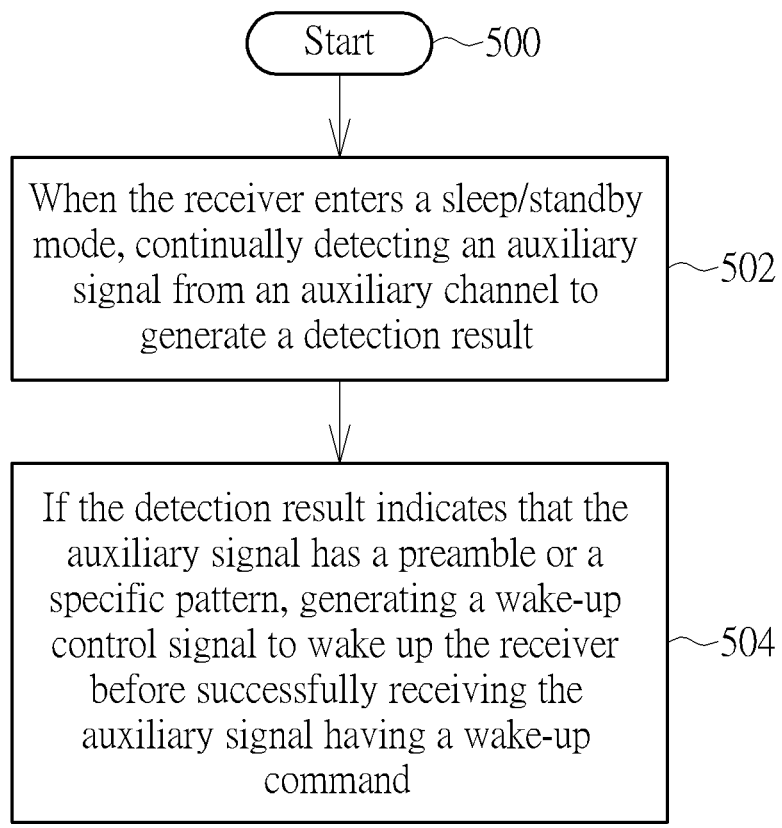
FIG. 5 is a flowchart of a control method of the DisplayPort receiver according to one embodiment of the present invention.

FIG. 5 is a flowchart of a control method of the DisplayPort receiver according to one embodiment of the present invention. Referring to the above embodiments, the flow is described as follows.

Step 500: the flow starts.

Step 502: when the receiver enters a sleep/standby mode, continually detecting an auxiliary signal from an auxiliary channel to generate a detection result.

Step 504: if the detection result indicates that the auxiliary signal has a preamble or a specific pattern, generating a wake-up control signal to wake up the receiver before successfully receiving the auxiliary signal having a wake-up command.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a receiver, comprising:
when the receiver enters a sleep/standby mode, continually detecting an auxiliary signal from an auxiliary channel to generate a detection result; and
if the detection result indicates that the auxiliary signal has a preamble or a specific pattern following the preamble, generating a wake-up control signal to start to wake up the receiver before successfully receiving an entire wake-up command following the preamble, wherein the specific pattern is only part of the wake-up command.

2. The control method of claim 1, wherein the step of generating the wake-up control signal to wake up the receiver before successfully receiving the entire wake-up command following the preamble comprises:
if the detection result indicates that the auxiliary signal has a toggle, it is determined that the auxiliary signal has the preamble, and the wake-up control signal is generated to wake up the receiver.

3. The control method of claim 2, wherein the receiver is waked up before the auxiliary signal has the wake-up command having logical values "0", "0", "1", "1" in sequence.

4. The control method of claim 1, wherein the step of generating the wake-up control signal to wake up the receiver before successfully receiving the entire wake-up command following the preamble comprises:
if the detection result indicates that the auxiliary signal has two consecutive logical values "0" or logical values "0", "0", "1" in sequence, it is determined that the auxiliary signal has the specific pattern, and the wake-up control signal is immediately generated to wake up the receiver.

5. The control method of claim 4, wherein the receiver is waked up before receiving the auxiliary signal having the wake-up command having logical values "0", "0", "1", "1" in sequence.

6. The control method of claim 1, further comprising:
when the receiver is waked up due to the wake-up control signal generated in response to the detection result indicating that the auxiliary signal has the preamble or the specific pattern, detecting if the receiver receives the auxiliary signal having the wake-up command following the preamble or the specific pattern to generate another detection result; and
if the other detection result indicates that the auxiliary signal does not have the wake-up command following the preamble or the specific pattern, generating a sleep control signal to make the receiver enter a sleep mode.

7. The control method of claim 6, wherein the step of generating the sleep control signal to make the receiver enter the sleep mode comprises:
if the other detection result indicates that the auxiliary signal does not have logical values "0", "0", "1", "1" in sequence after the preamble, it is determined that the auxiliary signal does not have the wake-up command, and the sleep control signal is immediately generated to make the receiver enter the sleep mode.

8. The control method of claim 1, wherein the receiver is complied with DisplayPort standard.

9. A circuitry within a receiver, configured to perform the steps of:
when the receiver enters a sleep/standby mode, continually detecting an auxiliary signal from an auxiliary channel to generate a detection result; and
if the detection result indicates that the auxiliary signal has a preamble or a specific pattern following the preamble, generating a wake-up control signal to start to wake up the receiver before successfully receiving an entire wake-up command following the preamble, wherein the specific pattern is only part of the wake-up command.

10. The circuitry of claim 9, wherein the step of generating the wake-up control signal to wake up the receiver before successfully receiving the entire wake-up command following the preamble comprises:
if the detection result indicates that the auxiliary signal has a toggle, it is determined that the auxiliary signal has the preamble, and the wake-up control signal is generated to wake up the receiver.

11. The circuitry of claim 10, wherein the receiver is waked up before the auxiliary signal has the wake-up command having logical values "0", "0", "1", "1" in sequence.

12. The circuitry of claim 9, wherein the step of generating the wake-up control signal to wake up the receiver before successfully receiving the entire wake-up command following the preamble comprises:
if the detection result indicates that the auxiliary signal has two consecutive logical values "0" or logical values "0", "0", "1" in sequence, it is determined that the auxiliary signal has the specific pattern, and the wake-up control signal is immediately generated to wake up the receiver.

13. The circuitry of claim 12, wherein the receiver is waked up before receiving the auxiliary signal having the wake-up command having logical values "0", "0", "1", "1" in sequence.

14. The circuitry of claim 9, further comprising:
when the receiver is waked up due to the wake-up control signal generated in response to the detection result indicating that the auxiliary signal has the preamble or the specific pattern, detecting if the receiver receives the auxiliary signal having the wake-up command following the preamble or the specific pattern to generate another detection result; and
if the other detection result indicates that the auxiliary signal does not have the wake-up command following the preamble or the specific pattern, generating a sleep control signal to make the receiver enter a sleep mode.

15. The circuitry of claim 14, wherein the step of generating the sleep control signal to make the receiver enter the sleep mode comprises:
if the other detection result indicates that the auxiliary signal does not have logical values "0", "0", "1", "1" in sequence after the preamble, it is determined that the auxiliary signal does not have the wake-up command, and the sleep control signal is immediately generated to make the receiver enter the sleep mode.

16. The circuitry of claim 9, wherein the receiver is complied with DisplayPort standard.

17. The control method of claim 1, wherein the step of generating the wake-up control signal to start to wake up the receiver before successfully receiving the entire wake-up command following the preamble comprises:
if the detection result indicates that the auxiliary signal has the preamble or the specific pattern, generating the wake-up control signal to start to recover/settle analog circuits of the receiver to wake up the receiver before successfully receiving the entire wake-up command.

18. The circuitry of claim 9, wherein the step of generating the wake-up control signal to start to wake up the receiver before successfully receiving the entire wake-up command following the preamble comprises:
if the detection result indicates that the auxiliary signal has the preamble or the specific pattern, generating the wake-up control signal to start to recover/settle analog circuits of the receiver to wake up the receiver before successfully receiving the entire wake-up command.

\* \* \* \* \*